United States Patent
Jones

(10) Patent No.: US 10,064,384 B2
(45) Date of Patent: *Sep. 4, 2018

(54) PET FEEDING APPARATUS

(71) Applicant: Paul Jones, Springdale, AR (US)

(72) Inventor: Paul Jones, Springdale, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/414,763

(22) Filed: Jan. 25, 2017

(65) Prior Publication Data

US 2017/0127645 A1     May 11, 2017

Related U.S. Application Data

(63) Continuation of application No. 14/792,299, filed on Jul. 6, 2015, now Pat. No. 9,585,364.

(51) Int. Cl.
*A01K 5/00*  (2006.01)
*A01K 5/01*  (2006.01)
*A01K 1/035*  (2006.01)
*A01K 1/03*  (2006.01)
*A01K 5/02*  (2006.01)

(52) U.S. Cl.
CPC ............ *A01K 1/0356* (2013.01); *A01K 1/034* (2013.01); *A01K 5/01* (2013.01); *A01K 5/0135* (2013.01); *A01K 5/0225* (2013.01)

(58) Field of Classification Search
CPC .. A01K 5/0291; A01K 5/0225; A01K 1/0356; A01K 5/02; A01K 1/10; A01K 5/01
USPC .................... 119/52.1, 51.01, 51.12, 61.2, 60
See application file for complete search history.

(56) References Cited

U.S. PATENT DOCUMENTS

| | | | | |
|---|---|---|---|---|
| 2,576,154 A * | 11/1951 | Trautvetter | .............. | A01K 5/01 119/61.2 |
| 5,046,455 A * | 9/1991 | Christiansen | ........ | A01K 5/0291 119/56.1 |
| 5,372,093 A * | 12/1994 | Pooshs | ................ | A01K 5/0291 119/51.11 |
| 5,447,119 A * | 9/1995 | Rasmussen | .......... | A01K 5/0241 119/51.5 |
| 5,555,842 A * | 9/1996 | Chocola | .............. | A01K 5/0275 119/51.11 |
| 2005/0229860 A1* | 10/2005 | Meritt | ...................... | A01K 1/10 119/53 |
| 2006/0137617 A1* | 6/2006 | Leombruno | ........ | A01K 5/0275 119/52.1 |

* cited by examiner

*Primary Examiner* — Yvonne Renee Abbott-Lewis
(74) *Attorney, Agent, or Firm* — Michael L. Greenberg, Esq.; Greenberg & Lieberman, LLC

(57) ABSTRACT

A gravity-fed, animal feeding apparatus is disclosed. The apparatus is equipped with a funnel, a food chute, and at least one feeding pan. The food chute of the apparatus preferably includes a transport tube configured to extend through a conventional chain-link fence gap via a diamond-shaped fitting, and terminate at the feeding pan disposed on the floor within the fenced pen area. The apparatus is configured to direct dry pet food fed into the funnel disposed on the exterior of the fenced pen area to the feeding pan on the interior of the fence. Gravity causes the food in the funnel to fall into the food chute, passing through the fence, and outputting the food to the feeding pan. The feeding pan is equipped with drainage holes to ensure that the dry food does not get wet, and that water does not collect in the feeding pan.

10 Claims, 2 Drawing Sheets

PET FEEDING APPARATUS

CONTINUITY

This application is a continuation application of non-provisional patent application Ser. No. 14/792,299, filed on Jul. 6, 2015, and priority is claimed thereto.

FIELD OF THE PRESENT INVENTION

The present invention feeding devices, and more specifically relates to a pet feeding device configured to facilitate the feeding of animals in a fenced pen while remaining outside of the fenced pen.

BACKGROUND OF THE PRESENT INVENTION

In many areas of the world, pets such as dogs are quite popular. Conventionally, animals such as dogs are often kept in an outdoor, fenced-in pen. Dogs may be kept in the pen for exercise, time-out, security, or for play. Many of such fenced pens are referred to as 'dog runs.' The majority of such fenced pens for animals consist of conventional, chain-link fencing having a square or diamond-shaped chain-link to ensure that the pets may not escape.

Unfortunately, when animal feeding within the fenced pen is required, an individual conventionally must enter the fenced pen to manually feed the animal(s). This can potentially result in the escape of the animal when the gate of the fenced pen is open. Additionally, animals such as dogs may jump up on the individual with excitement for food, occasionally scratching the individual with claws, or ripping clothing. Disheveled or mistreated animals in a fenced pen at an animal shelter may attack or charge the gate when it opens, ultimately leading to the escape of the animal, and/or injury to the individual and animal.

Thus, there is a need for a new animal feeding device configured to permit the feeding of fenced-in animals without the need for an individual to enter the fence, preventing the escape of the animals, and preventing the animals from jumping up on the individual. Such a device is preferably configured to feed more than one animal simultaneously, and is preferably equipped with multiple feeding pans. Additionally, such a device is preferably clog-free, and employs gravity to allow dry food to fall, in a controlled fashion within a food chute, through the chain-link fencing to the interior of the fence, and into the feeding pan(s). Additionally, such a device is preferably lightweight, and does not require any external structural support aside from the fence itself to remain in the desired functional position.

SUMMARY OF THE PRESENT INVENTION

The present invention is a pet feeding system and apparatus configured to facilitate the feeding of animals while remaining outside of a fenced animal pen. The basic components of the present invention include a hopper, a funnel, a feeding chute, and a food pan. The food chute preferably consists of several pieces which are configured to channel the food from the hopper to the food pan within the fenced pen. The several pieces preferably include at least one transport tube and at least one fitting. An ell shaped (elbow) fitting is preferably employed to change the direction of the food within the food chute so as to transverse horizontally or at an acute angle so as to travel through the chain-link of the fence, within a conventional diamond or square shaped chain-link gap. The ell fitting is preferably semi-rigid and adjustable. A diamond-shaped fitting is configured to extend into the chain-link gap, facilitating the travel of the food through the fence without entering the fenced area.

BRIEF DESCRIPTION OF THE DRAWINGS

The present invention will be better understood with reference to the appended drawing sheets, wherein.

DETAILED DESCRIPTION OF THE PREFERRED EMBODIMENT

Figure 2:
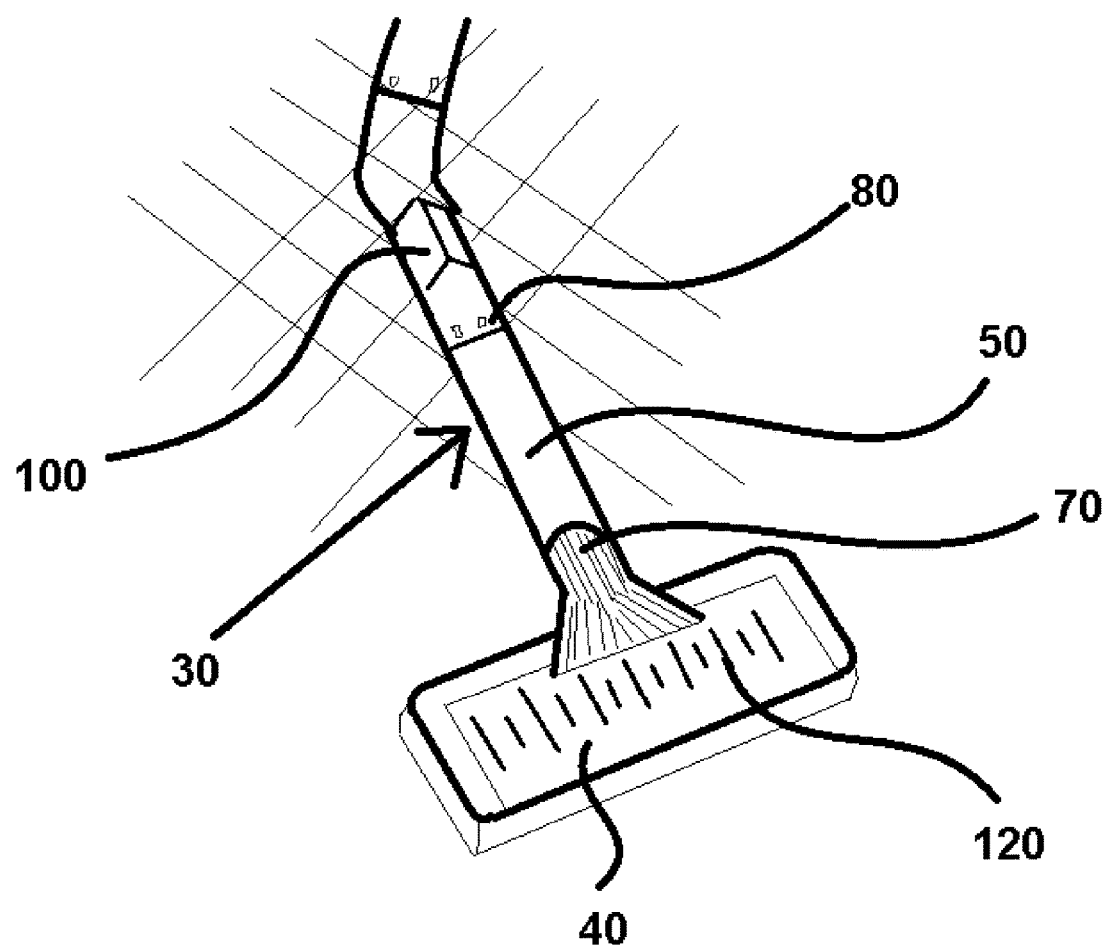
FIG. 2 shows a close up view of the feeding area and feeding chute of the present invention.

The present invention generally comprises a hopper (10), a funnel (20), a feeding chute (30), and a feeding pan (40). The feeding chute (30) employs at least one transport tube (50) and at least one fitting (60) to channel the pet food down to the feeding pan (40). The at least one fitting (60) and the at least one transport tube (50) of the present invention are preferably equipped with a ridged interior (70) in order to reduce the amount of drag exerted on the food as it falls through the feeding chute (30), as shown in FIG. 2.

Tension-based button connectors (80) are employed to interlock the at least one transport tube (50) to the at least one fitting (60), removably connecting them together forming the feeding chute (30). The use of tension-loaded button connectors (80), or other similar conventional spring-based button connector, is required for the correct function of the present invention, as spring-loaded button connectors (80) ensure that the ridged interior (70) remains unobstructed, and the flow of dry food in the feeding chute (30) remains unimpeded by screws, nails, nuts, or bolts commonly used in conventional fittings.

Figure 1:
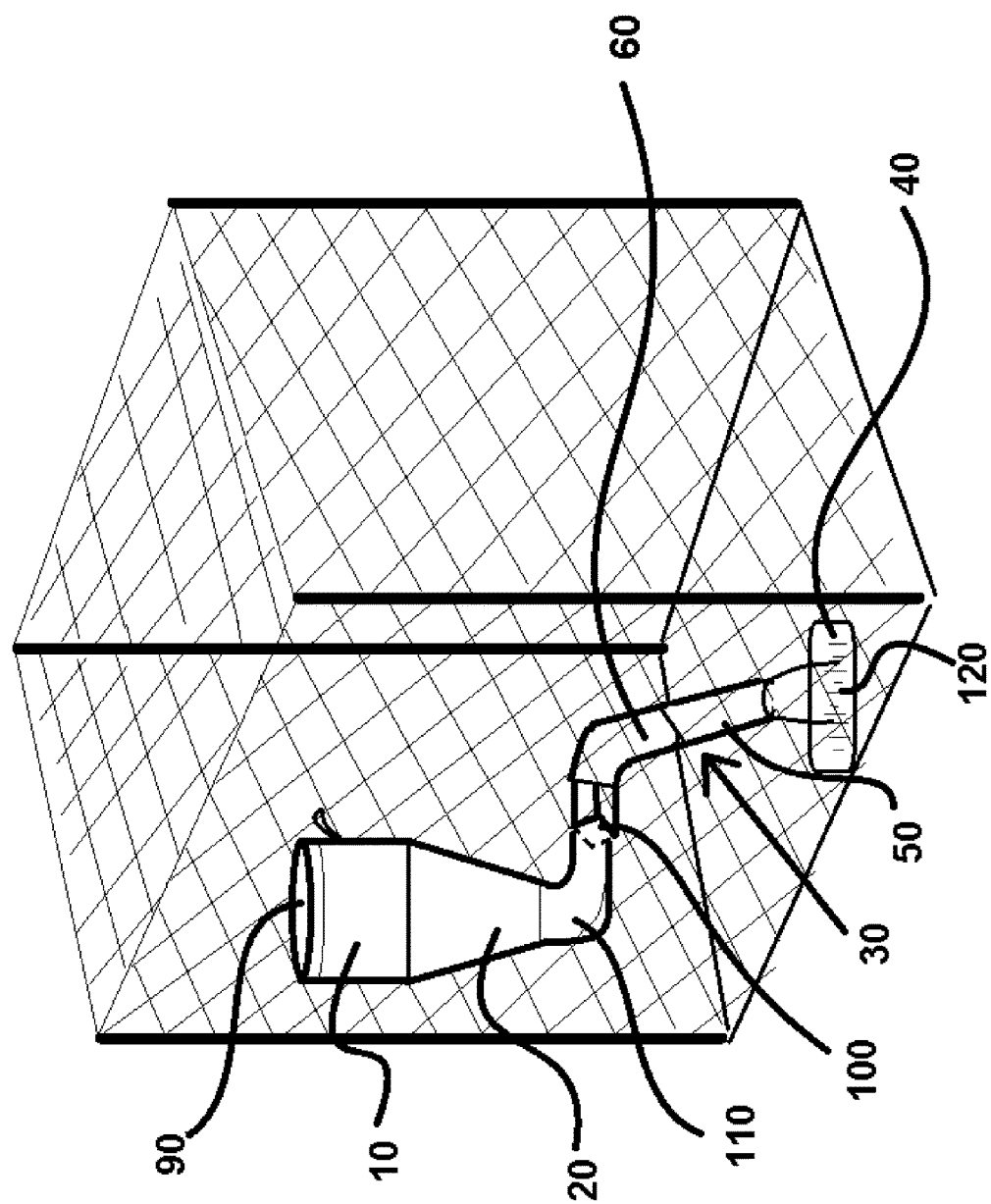
FIG. 1 displays a view of the preferred embodiment of the present invention as seen from the side, detailing the profile of the present invention as installed on a conventional fenced pen.

FIG. 1 displays the preferred embodiment of the present invention as installed on a fenced animal pen. The hopper (10) is disposed at the top of the apparatus, and is preferably equipped with a lid (90) to prevent rain and other elements from entering the feeding chute (30). The hopper (10) is preferably affixed to the fence of the pen with a mount. The funnel (20) is preferably disposed at the bottom of the hopper (10), and is configured to funnel the dry food down into the feeding chute (30).

The feeding chute (30) of the present invention is preferably adjustable and dynamic in that it may be configured to be mounted on a wide variety of fence sizes and shapes. Alternately sized fittings of the at least one fitting (60) of the present invention are preferably employed to alter the present invention for custom placement and mounting of the apparatus. The at least one transport tube (50) is then preferably affixed to an ell fitting (110) configured to partially pivot the direction of the flow of the apparatus so as to prepare to traverse through the vertical chain-link of the fenced pen. A diamond-shaped fitting (100) is affixed to the opposite side of the ell fitting (110), and is configured to fit snugly within the diamond-shaped gap conventionally present in common chain-link fences. An additional at least one transport tube (50) of the present invention is preferably disposed on the interior portion of the fence, affixed to the opposite end of the diamond-shaped fitting (100), and is configured to convey the dry food farther down to the ground, and into the feeding pan (40) to be eaten by the animal.

The feeding pan (40) of the present invention is preferably equipped with slots (120) or holes that are configured to allow water to drain out of the pan, ensuring that dry food traveling out of the feeding chute (30) remains dry after reaching the feeding pan (40).

Alternate embodiments of the present invention include modifications to the at least one transport tube (50), such as the integration of an internal divider within the at least one transport tube (50), so as to easily divert the flow of food within the feeding chute (30) in two directions, and therefore, to two separate feeding pans (40). Such an embodiment is useful when feeding multiple animals within a pen fairly is required. It should be understood that all embodiments of the present invention are envisioned to be lightweight, and do not require any external structural support aside from the fence itself to remain in the desired functional position.

It should be understood that, in all embodiments of the present invention, the tension-based button connector (80) is preferably integrated into the at least one fitting (60) itself (potentially including the diamond-shaped fitting (100)), and is configured to interlock with the at least one transport tube (50) to form the unitary feeding chute (30). The tension-based button connector (80) may be one of a variety of external clasps or securing mechanisms that do not infringe on the flow of food within the feeding chute (30). It is envisioned that small metallic flanges may be employed to reinforce the connection point of the tension-based button connectors (80) as well.

It should be understood that in alternate embodiments of the present invention, the diamond-shaped fitting (100) need not be diamond-shaped, and indeed may be shaped as a rectangle, a cylinder, a hexagon, or other tetrahedron. Ideally, the shape of the fitting matches that of the shape of the holes present within the chain-link fence on which the present invention is to be installed. It is envisioned that the round version of the diamond-shaped fitting (100) may be flexible in some embodiments, such that it may be used as a universal fitting for use on chain-link fences with abnormal or non-standard sizing. The same tension-based button connector (80) is preferably employed (regardless of the shape of the fitting traveling through the fence) to ensure that the fitting remains in position, attached to the at least one transport tube (50) during use.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A feeding apparatus for animals behind a fence comprising:
    a funnel;
    wherein said funnel is disposed on an outside of the fence;
    a food chute;
    a chain-link-shaped fitting, said chain-link-shaped fitting in communication with said food chute;
    wherein said chain-linked-shaped fitting traverses through a link in the fence;
    wherein said food chute is in communication with a bottom of said funnel;
    wherein said food chute is configured to extend through the fence via said chain-link-shaped fitting;
    a feeding pan, said feeding pan disposed below said food chute; and
    wherein said feeding pan is disposed within an interior of the fence.

2. The apparatus of claim 1, wherein said feeding pan is equipped with at least one drainage hole.

3. The apparatus of claim 2, wherein said food chute consists of at least one fitting and at least one transport tube.

4. The apparatus of claim 1, wherein said chain-linked-shaped fitting is connected to at least one transport tube via a tension-based connector.

5. The apparatus of claim 1, wherein said chain-linked-shaped fitting is configured to frictionally engage the fence between the chain-links, acting as a mount.

6. An apparatus for feeding animals within a chain-link fence comprising:
    a funnel;
    at least one transport tube;
    a fence-link-shaped fitting, wherein said fence-link-shaped fitting is interfaced with the chain-link fence, traveling through the chain-link fence;
    a pan;
    wherein said pan is disposed behind the chain-link fence;
    wherein said at least one transport tube conveys food to said pan; and,
    wherein said fence-link-shaped fitting is frictionally engaged with the chain-link fence.

7. The apparatus of claim 6, further comprising:
    an ell fitting; and,
    wherein said ell fitting is in communication with said funnel and said diamond-shaped fitting.

8. The apparatus of claim 7, further comprising:
    a hopper; and,
    wherein said hopper is disposed above said funnel.

9. An apparatus for feeding animals within a chain-link fence comprising:
    a funnel;
    at least one transport tube;
    a fitting, wherein said fitting is interfaced with the chain-link fence, traveling through the chain-link fence;
    a pan;
    wherein said pan is disposed behind the chain-link fence;
    wherein said at least one transport tube conveys food to said pan from said funnel; and
    wherein said fitting is frictionally engaged with the chain-link fence.

10. The apparatus of claim 9, wherein the interior portions of said at least one transport tube and said fitting are ridged.

* * * * *